United States Patent [19]

Park

[11] 4,058,581

[45] Nov. 15, 1977

[54] METHOD OF MAKING THERMOPLASTIC RESIN COMPOSITE

[75] Inventor: Im K. Park, Summit, N.J.

[73] Assignee: Exxon Research & Engineering Co., Linden, N.J.

[21] Appl. No.: 736,331

[22] Filed: Oct. 28, 1976

Related U.S. Application Data

[63] Continuation of Ser. No. 274,497, July 24, 1972, abandoned.

[51] Int. Cl.$^2$ .............................................. B29D 3/02
[52] U.S. Cl. ................................. 264/136; 264/134; 264/137; 156/166
[58] Field of Search ................. 264/134, 136, 137; 156/155, 166, 167, 180

[56] References Cited

U.S. PATENT DOCUMENTS

| 2,031,636 | 2/1936 | Dreyfus | 156/180 |
|---|---|---|---|
| 2,041,798 | 5/1936 | Taylor | 156/167 |
| 2,778,763 | 1/1957 | Novak | 156/180 X |
| 3,125,462 | 3/1964 | Rachinsky | 260/878 X |
| 3,134,704 | 5/1964 | Modigliani | 161/150 X |
| 3,185,747 | 5/1965 | Boggs | 156/166 X |
| 3,347,692 | 10/1967 | Young | 260/878 R |
| 3,416,990 | 12/1968 | Robinson | 161/156 X |
| 3,586,560 | 6/1971 | Stranch | 156/167 |
| 3,703,396 | 11/1972 | Lamanche | 264/137 X |
| 3,742,106 | 6/1973 | Price | 264/134 |

FOREIGN PATENT DOCUMENTS

946,384   1/1964   United Kingdom ................ 260/878

*Primary Examiner*—Richard R. Kucia
*Attorney, Agent, or Firm*—Joseph J. Dvorak

[57] ABSTRACT

A unidirectional fiber reinforced thermoplastic stock material is prepared by passing fibers through a resin solution to coat the fibers. The coated fibers are treated to remove the solvent and thereafter are consolidated into the desired shape.

8 Claims, No Drawings

METHOD OF MAKING THERMOPLASTIC RESIN COMPOSITE

This is a continuation of application Ser. No. 274,497, filed July 24, 1972, now abandoned.

BACKGROUND OF THE INVENTION

This invention relates to fiber reinforced plastics. More particularly, this invention relates to oriented-fiber thermoplastics and methods for continuously preparing oriented-fiber thermoplastic stock material.

It is well known that plastic materials can be reinforced by imbedding in the plastic matrix randomly oriented strands of fibers in the form of cut staple, i.e. fibers that are cut into short lengths of 1 to 5 inches. While it is recognized that fiber reinforced plastics have physical and mechanical properties that make them particularly well suited for use where high strength, low weight and good chemical resistance are particularly important, full commercial exploitation of such materials has not been achieved because of a lack of a completely economical method of preparing these materials.

Perhaps, one of the simplest techniques for forming reinforced plastic matrix is to first coat the fiber with a thermoset resin, such as an epoxy resin, and thereafter cut the resin coated fiber into staple lengths. This technique has the disadvantage in that it is generally difficult to control the amount of fiber loading in the composite over a wide range. Since the viscosity of uncured thermoset resin is generally low, the fiber content of the resulting composite material tends to be high (e.g. usually greater than 40 volume %). Nonetheless fiber reinforced thermoset resins are commercially available.

Other reinforced thermoplastics would appear to offer certain more attractive properties from a commercial point of view than thermoset resins; however, numerous difficulties in fabricating such materials have been encountered.

Among the approaches employed in fabricating composites of fibers and thermoplastic resins is that described in British Pat. No. 1,228,573. That patent teaches making a composite from reinforcing filaments of staple length by arranging them either randomly or in a particular pattern along with thermoplastic filaments or films and coalescing the entire mass in a mold under elevated temperatures and pressure to produce the composite material. This process suffers from being uneconomical especially when considering all the attendant problems of quality control and uniformity of products that batch processing entails. Moreover, short chopped fibers are not easily wet by thermoplastic resins and therefore do not impart the same strength to the composite as do continuous fibers. Continuous fibers can be considered to be fibers that have an aspect ratio, i.e., a ratio of length to diameter, greater than 250. Additionally chopped fibers can only be randomly oriented within the matrix while continuous fibers can be arranged in a specific direction in the matrix.

A second technique for applying a thermoplastic coating to a fiber involves coating a continuous fiber, for example, with a polymer melt. Such a technique, of course requires, in the first instance, that the polymer be thermally stable. In addition, however, the viscosity of the polymer melt is usually very high and it becomes difficult to achieve good wetting and fiber penetration with the polymer melt.

Another approach to applying or impregnating a fiber with a thermoplastic resin employs the use of a fluidized bed of the powdered polymer. This technique avoids the thermal degradation problems present in the melt technique since only the polymer powder which comes in contact with the fiber is brought to the melt temperature. While minimizing the thermal degradation problems, however, the problems of wetting and penetration remain.

In yet another method described, in British Pat. No. 1,227,756, a solution of a polymer is used for coating reinforcing filaments. The solvent subsequently is removed and the filaments are then cut into stable lengths and blended with additional matrix material for compounding.

As indicated in British Pat. No. 1,227,756, the chopped fibers can be blended with matrix material and molded into a desired shape. Such blending, of course, does not permit specific orientation of the fibers in the matrix material.

Consequently, despite the advances made by the foregoing techniques in fiber reinforcing thermoplastics, there is an ever increasing need for new and improved techniques in forming such materials.

SUMMARY OF THE INVENTION

According to the present invention, fiber reinforced thermoplastic composite stock materials are prepared simply and continuously by drawing a plurality of filaments through a solution of a thermoplastic resin to coat the fibers with the resin. Thereafter the solvent is removed from the coated fibers and the coated fibers are consolidated into a predetermined cross-sectional shape and size under heat and pressure. Preferably consolidation is achieved by pulling the coated fibers through shaping means under pressure and a temperature at least equal to the melting point of the resin. The shaped composite is then allowed to cool, thereby providing an oriented fiber reinforced thermoplastic composite of predetermined cross-sectional shape. Optionally, consolidation is achieved by compression molding.

In the practice of the instant invention it is particularly important that the polymer in the solution be heated to the highest temperature possible without incurring any substantial thermal or chemical degradation of the polymer; and, it is preferred that this elevated temperature be maintained while the solvent is being removed from the fiber coated with the polymer solution. While the polymer solution generally will contain between about 2% to about 30% by weight of resin, it is particularly preferred in the practice of the instant invention that the polymer solution contain from about 5 to about 12% by weight of resin.

As the coated fibers are melted and formed into a composite shape, the melt formed shape is cooled under confining pressures to a temperature below the melting point of the resin.

In one embodiment of the present invention a method is provided for forming the fiber reinforced thermoplastic composite having both continuous and discontinuous fibers by incorporating discontinuous fibers in the polymer solution.

In yet another embodiment of the present invention fiber reinforced thermoplastic sheets are made by passing the thermoplastic resin coated fibers between the nip of heated rolls.

In another embodiment of the present invention different types of fibers are passed through the polymer solution in layers and thereafter treated in the manner outlined herein to provide a laminate of different fiber types in a polymer matrix.

These and other features of the instant invention will be readily apparent upon reading the detailed description which follows.

DETAILED DESCRIPTION

While the process of the instant invention will be described with particular reference to graphite fiber reinforced polypropylene, the process of the instant invention is applicable to the reinforcement of thermoplastics generally by typical fiber reinforcing materials. Thus, continuous fibers of glass, boron, graphite and carbon all can be used, alone or in combination to reinforce thermoplastics such as polyolefins and their derivatives, including acrylic acid modified polyolefins, polyvinyl halides, polyethers, polycarbonates, polyamides, polyvinylidene halides, polystyrene, polycarbanic acid and the like.

In the practice of the instant invention, it is particularly preferred to use graphite fibers with acid grafted polyolefin resins such as acrylic acid grafted polypropylene. Such acid grafted polymers are particularly suitable for wetting the graphite fiber and form an unusually good bond between the fiber and resin.

According to the method of this invention, a bundle of fibers having from about 400 to 160,000 filaments on a spool are mounted on a creel or frame so that they can be unwound and treated or impregnated with the thermoplastic resin. For example, the fibers can be pulled through the resin bath. Optionally, of course, spools containing single filaments of fiber can be supported on a creel and these individual threads can be passed through an annular structure for gathering the filaments from the plurality of spools into a suitable bundle of fibers for impregnation with the polymer.

Typically the bundle of fibers will be of one fiber material. For example, the bundle will normally contain all graphite fibers, all glass fibers, or the like. However, bundles of mixed fibers may be used. Also, layers of bundles may be impregnated with polymer according to this invention. In this instance each layer preferably will consist of a uniform fiber type different from the next adjacent layer. Various other combinations are possible of course.

The number of individual fiber filaments that are to be impregnated with the thermoplastic resin depends in part upon the desired fiber loading in the end product. Similarly, the extent to which the fiber bundle is spread when it is treated with the polymer solution will have an effect upon the amount of polymer picked up by the fibers. The selection of the number of filaments to be treated and the extent to which they are gathered or conversely, the extent to which the bundle is spread, before being impregnated with polymer solution can be readily adjusted by those with ordinary skill in the art.

In any event a number of fibers are treated with polymers by pulling or passing the fibers as a bundle through a solution of the polymer.

As already mentioned, the thermoplastic resin is selected from a large group of materials including polyethylene, polypropylene, acrylic acid-grafted polypropylene, and their copolymers. Among the solvents suitable for such materials are hydrocarbons, chlorohydrocarbons, higher ketones, higher aliphatic esters and the like.

In order to assure good coating of the fiber and adequate fiber pickup at reasonable feed rates, the polymer solution should contain between about 2 to about 20% by weight of resin. Preferably, polymer solution contains about 5 to about 12% by weight of resin.

It is also important that the polymer solution be heated to minimize the solution viscosity to enhance its penetration into the fiber bundles. Generally, the polymer solution is heated in the range of about 80° C. to about 145° C. The exact temperature at which the polymer solution will be heated depends upon the boiling point of the solvent used and the thermal stability of the polymer. For a xylene solution of acrylic acid grafted polypropylene it is particularly preferred, for example, to heat the polymer solution in the range of about 115° to 135° C.

The heated solution should have a viscosity in the range of about 2 to 4000 centipoise and preferably in the range of about 5 to 30 centipoise.

By adjusting the viscosity, the spread of the fibers as they pass through the polymer solution, and the speed or rate at which they pass through the polymer solution, the amount of resin that can be picked up by the fibers can thereby be adjusted or varied.

The foregoing technique permits the fiber loading to be adjusted over a broad range. Actually, the fiber loading will range from about 10 to 50% by volume, depending upon the desired mechanical properties of the composite material. This ability to use fiber contents below 40% in a thermoplastic matrix stands in marked contrast to processes which employ thermoset resins, such as epoxies. Because of the inherently low viscosity of the uncured thermoset resins, it is difficult to achieve a low fiber content in the resin matrix. The ability to use low fiber loadings is particularly important since the filaments often are extremely costly. Thus the present process offers considerable economic advantages in addition to the ability to make composites having a broader range of mechanical properties.

Returning now to the process according to this invention, the fibers are passed through a solution of the thermoplastic resin at a rate sufficient to deposit from about 20 to about 80 wt. % of resin. Preferably, the fibers are passed through the solution at a rate sufficient to deposit from about 30 to about 70% of resin. Upon leaving the polymer solution, the coated fibers are treated to remove solvent. This is most conveniently achieved by passing the fibers through a heated chamber. Preferably the solvent is removed by the circulation of hot air or an inert gas through the chamber. Alternatively, the solvent can be removed by a washing or leaching operation followed by drying.

The coated fibers are next heated at least to the melting point of the resin and consolidated under pressure and in a shaping means such as a heated die. After consolidating and heating under pressure, the composite is cooled under pressure. This operation is most efficiently achieved by a pultrusion technique; i.e., the coated fibers are pulled through a heated die and then pulled through a cooling die to yield a composite having all the fiber oriented at 0° to the direction of pull. In this manner, continuous plies of graphite fiber composites having a thickness of ⅛ inch and width of ¾ inch have been produced. Virtually any shape that can be defined by a die, however, can be made. Moreover, while all the fiber was oriented at 0° to the pulling direction, shorter fibers can be coated with the continuous fibers by incorporating or adding the shorter fibers into the polymer solution. In this manner a continuous and discontinuous fiber can be coated by pulling a continuous fiber bundle through a coating solution.

In another embodiment of the present invention, sheets of fiber reinforced thermoplastic material are readily prepared by passing heated resin impregnated fibers through the nip of two rollers. In other words, the process as outlined above is employed but in lieu of the heated die assembly mentioned above, heated rolls are used to produce composite sheet material. Preferably, the upper roll is heated to a temperature above the melting point of the resin while the lower roller is set below the melting temperature and a non-sticking interlay paper, such as silicone coated release paper, is fed into the roller assembly on top of the heated resin fiber composite. In this way the surface of the roll is kept reasonably clean. Thus, by pulling two plies of plastic impregnated fiber, each ply having a thickness of about 0.002 inch through heated rolls, a composite sheet having a thickness of about 0.004 inch was obtained.

Illustrative of one of the advantages of the process of the present invention is the resin impregnated fibers can be melted and molded in times of the order of minutes compared with molding times in the order of hours for thermoset resins. As can be seen from Table I as follows, thermoplastic resins can be prepared having mechanical property characteristics substantially comparable to those achieved with thermosetting resins.

TABLE I

| Fiber | Matrix | Vol.% Fiber | Flexural Modulus, psi × $10^{-6}$ | Flexural Strength, psi × $10^{-3}$ | Shear Strength, psi |
|---|---|---|---|---|---|
| Graphite-Great Lakes 6T | Polypropylene | 38 | 13 | 56 | 3000 |
| Graphite-Greak Lakes 6T | Acrylic acid grafted polypropylene | 47 | 19.4 | 89.6 | 9000 |
| Graphite-Great Lakes 6T | Epoxy | 57 | 22 | 20 | 9000 |
| E-glass | Acrylic acid grafted polypropylene | 55 | 5.2 | 82 | — |
| Graphite-Great Lakes 3T | Acrylic acid grafted polypropylene | 47 | — | 90 | — |
| Graphite-Great Lakes 4T | Acrylic acid grafted polypropylene | 40 | 15 | 100 | — |

The flexural modulus and strength were determined in accordance with ASTM Test Method D-790. The composite test specimen was a rectangular bar having a thickness of ⅛ inch and a width of ¼ inch. The test was conducted using a span to depth ratio of 16 to 1.

The shear strength was determined in accordance with the short beam method, ASTM D2344, using a span to depth ratio of 4 to 1.

In the above table the graphite fibers employed were commercially available from Great Lakes Carbon Corporation, 3T, 4T and 6T being manufacturer's designation of various grades of their graphite fiber tow products. E-glass is a trade designation of a commercially available grade of glass filament having relatively low mechanical strength.

As can be seen from the above table, acrylic acid grafted polypropylene when reinforced with graphite fibers provides a composite that has a significantly greater shear strength than unmodified polypropylene. Presumably some of the significantly improved properties of the modified polyolefin can be attributed to better wetting of the fiber.

The composites of the instant invention have considerable utility because they can be heated and reshaped into numerous configurations. Additionally they can be machined if so desired.

As is known, graphite has been used as a bioengineering material because of its biological and chemical inertness. Plastic such as polyethylene and polyurethane also have recently been used for implants in hip joints. Although both of these plastic materials have been useful because of their compatibility with body tissues and body fluids they often do not have the mechanical properties which would permit wide use. The present invention, however, provides a composite of implantable bio-materials which in composite form have much greater strength and improved mechanical properties making the material extremely useful for a wide variety of implant applications.

Other reinforced sheet material prepared according to the instant invention can be used in forming hollow oriented fiber composites. In the past, hollow items of filamentary composites have been formed primarily by winding the filament bundles impregnated with uncured thermoset resin around a mandrel followed by the curing which involves the polymerization of the resin. Because of the low viscosity of the uncured resin and consequent low resin pickup the products generally are limited to high fiber contents.

By heating a sheet of oriented fiber thermoplastic resin composite prepared in accordance to the instant invention to the melting point of the resin, and then wrapping the composite sheet around a mandrel, after cooling a hollow article results. The sheet of oriented fiber thermoplastic can comprise any number of plies of filaments, each ply oriented to meet the loading requirements of the final article. Winding can be done circumferentially around the mandrel straight or in spirals according to the loading requirements. By placing the heat source in proximity to the winding unit, heating and forming can be done in a continuous manner.

For example, the unidirectional graphite fiber reinforced polypropylene sheet prepared above which had a thickness of about 0.004 inch was stacked in five plies so that the fibers were oriented with respect to each ply alternately at 0° and 90°, 0° plus 90° and 0° and consolidated under heat and pressure. A sheet thus formed was heated to 170° C. and wrapped around a teflon mandrel having a diameter of ½ inch. After cooling the sheet, the mandrel was removed providing a finished tube.

Tubular articles, cones and other hollow shapes can be prepared similarly.

To further demonstrate the usefulness of oriented fiber resins a short leg brace for use in an orthotic application was fabricated from a stock composite prepared according to the process of the instant invention. The particular composite employed contained 40 volume % of unidirectional graphite fiber in a polypropylene matrix. The side bar was 18 inches long by ¼ inch thick by ⅜ of an inch in width. The straight stock material was very simply heat shaped to conform to an impression of the wearer's leg. In this way a side bar was obtained that conformed exactly to the shape of the leg. This is a vast improvement over metal bars which are very difficult to reshape exactly and stress concentrations at bends tend to cause failure. Moreover, metal side bars are exceedingly heavy and present considerable discomfort to the wearer.

Laminates of fiber reinforced plastics can be prepared with the stock material of this invention. Particularly useful laminates include metal layers such as copper or aluminum reinforced with the fiber reinforced thermoplastic. Indeed, the fiber reinforced acrylic acid modified polypropylene can be applied with heat to the metal layer. In marked contrast, reinforced epoxy based composites are bonded to other materials with the aid of adhesives.

What is claimed is:

1. A method for producing a fiber reinforced thermoplastic resin stock having about 10 to 50% by volume of fiber therein comprising continuously passing graphite fiber material as a multiplicity of individual strands through a solution of thermoplastic resin to coat the fiber with resin solution, said resin being an acrylic acid grafted polyolefin and said solution having a viscosity in the range of about 2 to 4000 centipoise while being maintained at a temperature in the range of about 80° C to 145° C; treating the solution coated fibers to remove the solvent; consolidating said coated fibers into a predetermined cross-sectional shape and size while heating the coated fibers to a temperature sufficient to melt the resin; and, thereafter cooling the shaped resin coated fibers under confining pressures to a temperature below the melting point of the resin whereby a continuous fiber reinforced thermoplastic stock material is obtained having low fiber loadings between about 10 to 50% by volume.

2. The method of claim 1 wherein the fibers are consolidated into a predetermined cross-sectional shape and size in a compression molding die.

3. The method of claim 1 wherein the fibers are consolidated into a predetermined cross-sectional shape by pulling the coated fibers through a heated die and then a cooling die.

4. The method of claim 1 wherein the coated fibers are consolidated and shaped by passing the coated fibers between the nip of a pair of heated rolls thereby producing a sheet of composite material having substantially unidirectional continuous fiber reinforcement.

5. The method of claim 1 wherein layers of fibers are passed through the thermoplastic resin solution.

6. The method of claim 1 wherein the thermoplastic resin solution contains from 2 to 30% by weight of resin and has a viscosity when heated in the range of about 5 to 30 centipoise.

7. The method of claim 1 wherein the polymer solution contains from about 5 to about 12% by weight of resin.

8. The method of claim 1 wherein discontinuous fibers are suspended in the solution of thermoplastic resin whereby the stock material has substantially unidirectional continuous fibers and random oriented discontinuous fibers.

* * * * *